United States Patent [19]

Fischer et al.

[11] Patent Number: 4,780,269
[45] Date of Patent: Oct. 25, 1988

[54] HORIZONTAL MODULAR DRY IRRADIATED FUEL STORAGE SYSTEM

[75] Inventors: Larry E. Fischer, Los Gatos; Ian D. McInnes; John V. Massey, both of San Jose, all of Calif.

[73] Assignee: Nutech, Inc., San Jose, Calif.

[21] Appl. No.: 711,067

[22] Filed: Mar. 12, 1985
(Under 37 CFR 1.47)

[51] Int. Cl.⁴ .......................... G21C 19/08; G21F 5/00
[52] U.S. Cl. .................................... 376/272; 220/408; 220/415; 250/507.1
[58] Field of Search ............... 220/408, 415, 453; 250/507.1; 376/272

[56] References Cited

U.S. PATENT DOCUMENTS

| | | | |
|---|---|---|---|
| 3,199,933 | 1/1964 | Allen | 250/507.1 |
| 3,255,896 | 6/1966 | Sklorz | 376/272 |
| 3,705,851 | 12/1972 | Brauer . | |
| 3,727,059 | 4/1973 | Reese . | |
| 3,727,060 | 4/1973 | Blum . | |
| 3,754,140 | 8/1973 | Beierle | 250/507.1 |
| 3,780,306 | 12/1973 | Anderson et al. . | |
| 3,859,799 | 1/1975 | Jaco, Jr. . | |
| 3,940,940 | 3/1976 | Barrett . | |
| 4,052,944 | 10/1977 | Jennings . | |
| 4,147,938 | 4/1979 | Heckman et al. . | |
| 4,166,709 | 9/1979 | Valiga . | |
| 4,177,385 | 12/1979 | Bevilacqua . | |
| 4,197,467 | 4/1980 | Williams | 376/272 |
| 4,234,798 | 11/1980 | Baatz et al. . | |
| 4,299,659 | 11/1981 | Hame et al. | 376/272 |
| 4,339,411 | 7/1982 | Knackstedt et al. . | |
| 4,342,620 | 8/1982 | Vickrey . | |
| 4,350,461 | 9/1982 | Valiga et al. . | |
| 4,356,146 | 10/1982 | Knappe et al. | 376/272 |
| 4,366,114 | 12/1982 | Kühnel et al. | 376/272 |
| 4,459,260 | 7/1984 | Bradley | 376/272 |
| 4,498,011 | 2/1985 | Dyck et al. | 250/507.1 |
| 4,527,066 | 7/1985 | Dyck et al. | 250/507.1 |
| 4,527,067 | 7/1985 | Dyck et al. | 250/507.1 |
| 4,527,068 | 7/1985 | Dyck et al. | 250/507.1 |
| 4,532,428 | 7/1985 | Dyck et al. | 250/507.1 |
| 4,535,250 | 8/1985 | Fields | 250/507.1 |
| 4,680,159 | 7/1987 | Lahr et al. | 376/272 |
| 4,713,199 | 12/1987 | Spilker et a. | 376/272 |

FOREIGN PATENT DOCUMENTS

| | | | |
|---|---|---|---|
| 2251380 | 4/1973 | Fed. Rep. of Germany | 376/272 |
| 3301735 | 8/1984 | Fed. Rep. of Germany | 376/298 |

OTHER PUBLICATIONS

Nuclear Engineering International, Dec. 1986, pp. 46-48.

Primary Examiner—Deborah L. Kyle
Assistant Examiner—Richard W. Wendtland

[57] ABSTRACT

A horizontal, modular, dry, irradiated fuel storage system (10) includes a thin-walled canister (12) for containing irradiated fuel assemblies (20), which canister (12) can be positioned in a transfer cask (14) and transported in a horizontal manner from a fuel storage pool (18), to an intermediate-term storage facility. The storage system (10) includes a plurality of dry storage modules (26) which accept the canister (12) from the transfer cask (14) and provide for appropriate shielding about the canister (12). Each module (26) also provides for air cooling of the canister (12) to remove the decay heat of the irradiated fuel assemblies (20). The modules (26) can be interlocked so that each module (26) gains additional shielding from the next adjacent module (26). Hydraulic rams (30) are provided for inserting and removing the canisters (12) from the modules (26).

11 Claims, 4 Drawing Sheets

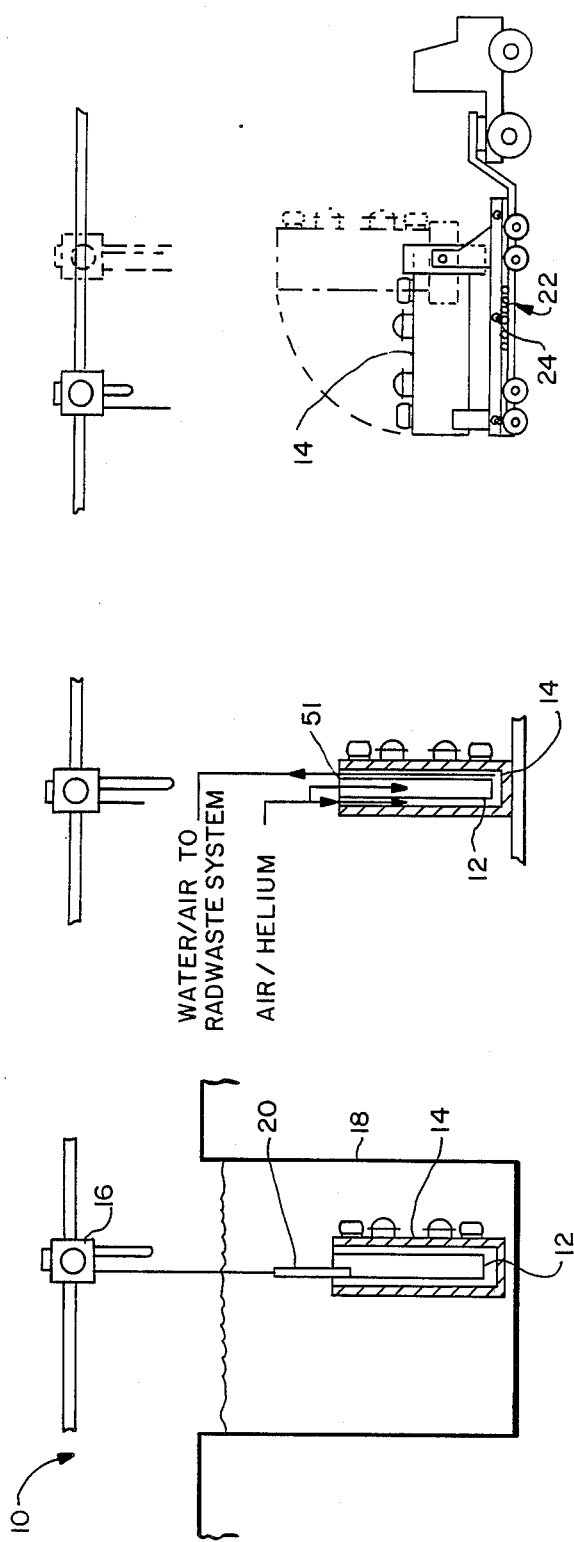

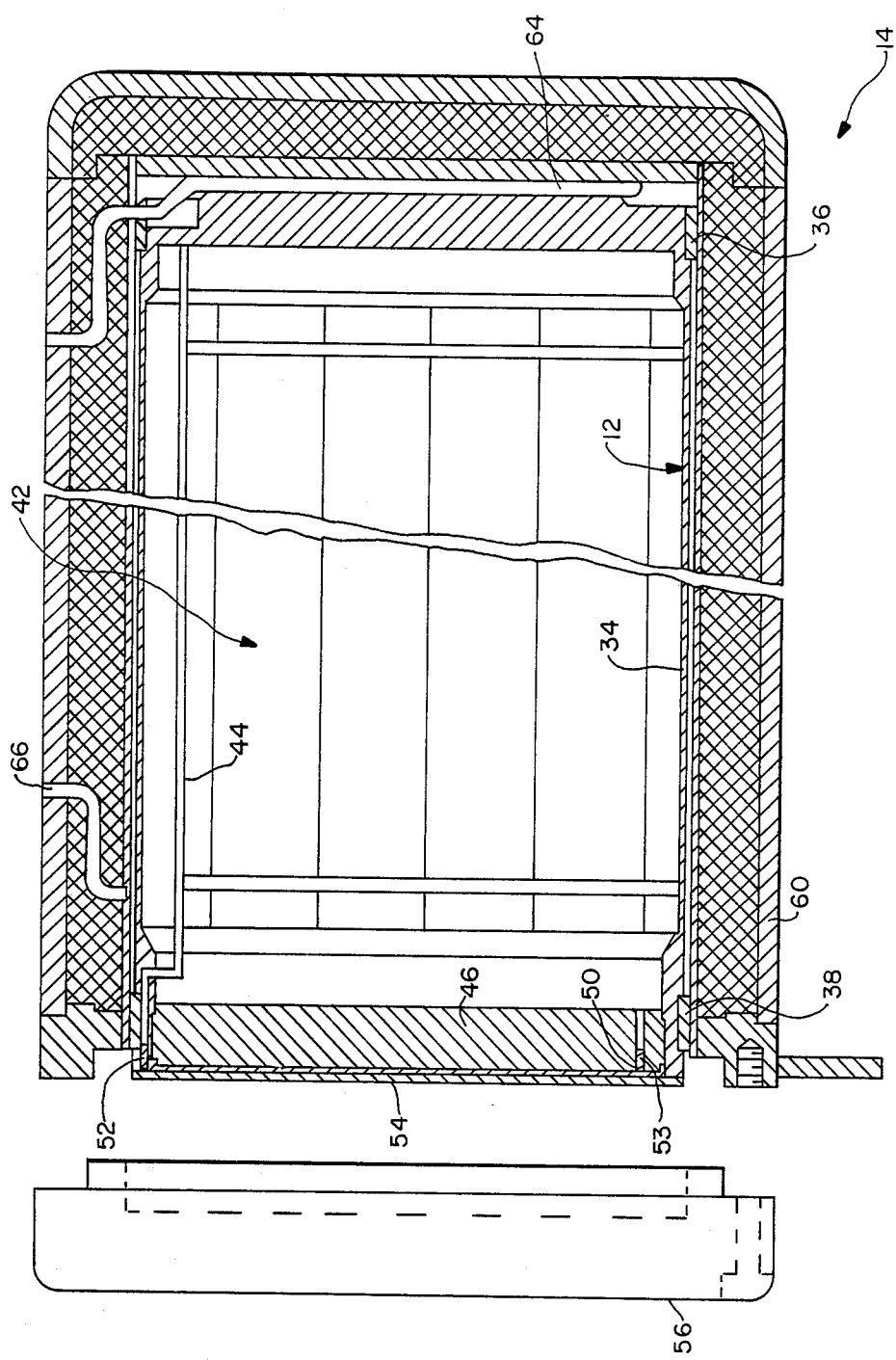
FIG.—5

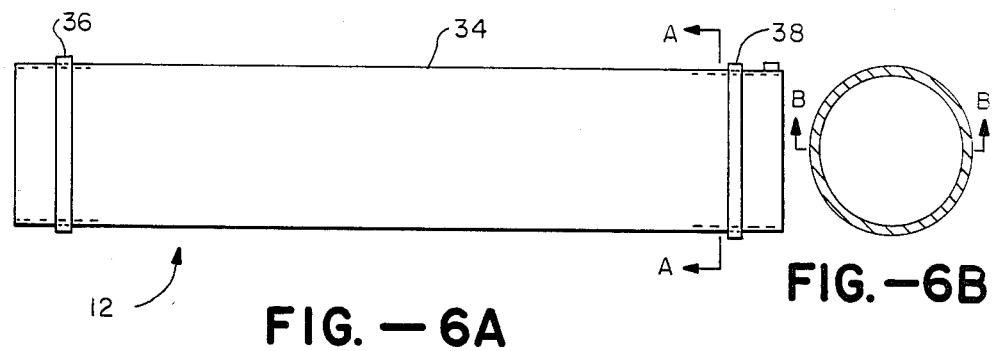
FIG.—6A  FIG.—6B
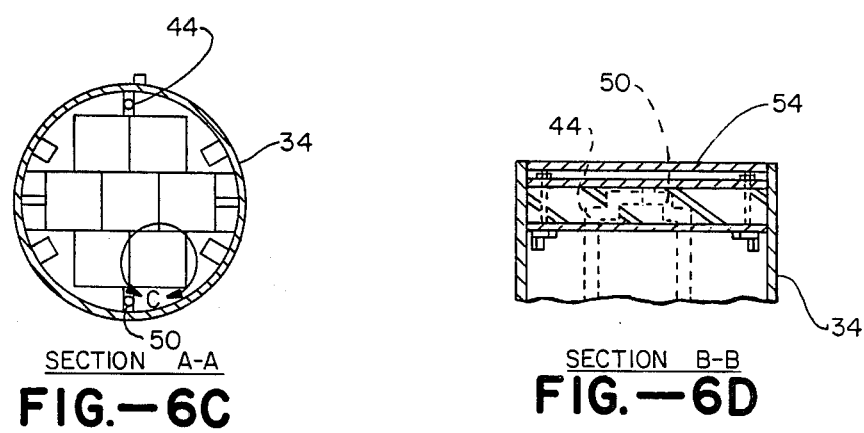
SECTION A-A
FIG.—6C
SECTION B-B
FIG.—6D
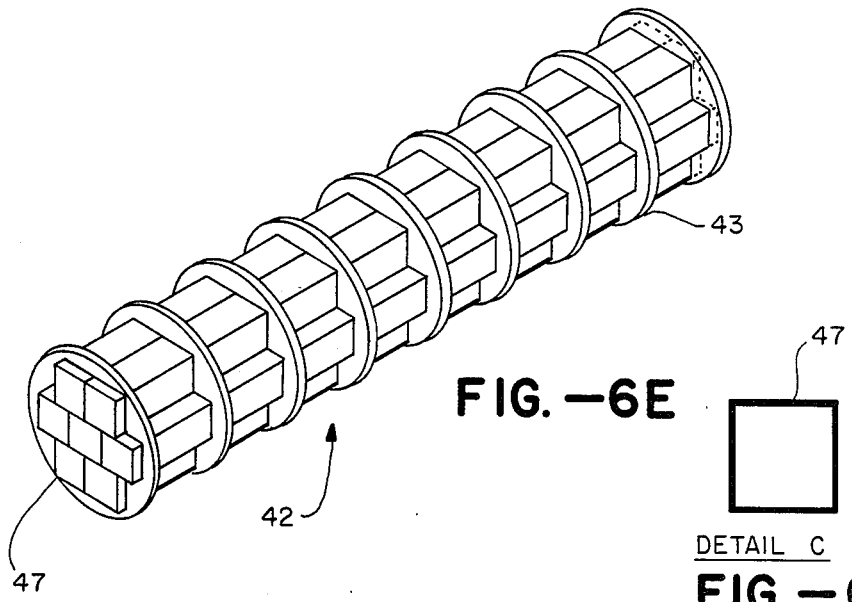
FIG.—6E
DETAIL C
FIG.—6F

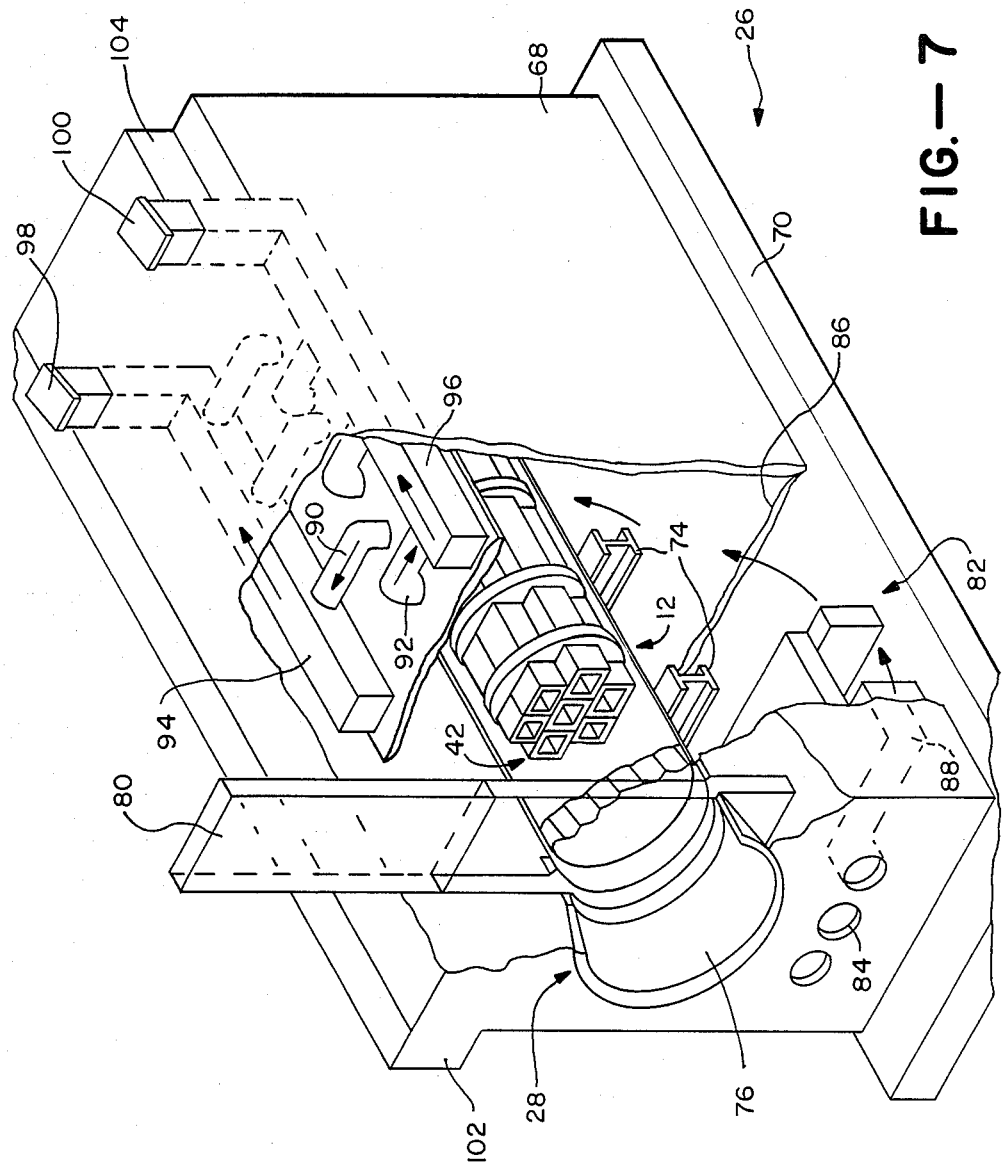

HORIZONTAL MODULAR DRY IRRADIATED FUEL STORAGE SYSTEM

FIELD OF THE INVENTION

The present invention relates to an above-ground system for storing on an interim or long-term basis irradiated nuclear fuel.

BACKGROUND OF THE INVENTION

Part of the operation of a nuclear power plant is the removal and disposal of irradiated nuclear fuel assemblies. Most early reactors were originally built to store from three to five years capacity of irradiated fuel assemblies in a storage pool. From the storage pool, the irradiated fuel assemblies could be reprocessed or sent to long-term storage. However since 1977, due to uncertainties in the federal policies relating to reprocessing of irradiated fuel and also in the establishment of permanent irradiated fuel dumps, on-site irradiated fuel storage facilities have been stressed to their capacity for storing these irradiated fuel assemblies. To prevent the forced shutdown of these plants due to the overcrowding of storage pools, a number of near-term irradiated fuel storage concepts have been developed and/or utilized.

The first among these is the development of high density irradiated fuel racks which can be installed in existing storage pools. This type of rack generally increases the storage capacity of a pool by two to three times. Unfortunately, this re-racking is not always sufficient to provide storage capacity for the life of the plant.

Another possible solution is fuel rod consolidation or compaction. In this solution, the individual fuel rods are separated from the fuel assemblies and are placed into canisters in a closely packed configuration, with the canisters being stored in storage pool racks. This option is limited to a low percentage of existing plants because of the structural load limitations on storage pool foundations.

Nuclear energy plants have considered various types of dry storage devices for irradiated fuel. There are basically three types of dry storage facilities. The first includes a cask storage system which is an above-ground monolithic structure with thick walls comprised of a shielding material such as steel, nodular cast iron, depleted uranium, lead, or concrete surrounding a central internal cavity which contains one or more fuel bundles. Due to the size and weight of the typical storage cask, only about half of the utilities can implement this type of storage without considerable expense. This system can be implemented either with a cask which has space for a multiplicity of fuel bundles or an above-ground silo which is used for one fuel bundle.

Another dry storage concept is the use of a dry well, which is also known as caisson storage. This concept involves using lined holes in the earth which are deep enough to accommodate the irradiated fuel and a shielding plug. The dry well relies on the properties of the surrounding earth for shielding and heat reduction. This type of storage requires considerable land space above the flood plane.

Another dry storage concept is the use of air-cooled vaults. This system is also referred to as canyon storage. The vaults consist of shielded structures with storage racks into which the irradiated fuel is placed and around which air can circulate to remove irradiated fuel decay heat. The vaults are located below ground, as are the dry wells. As with the dry wells, this type of storage tends to be relatively expensive.

All of the above dry storage systems store the fuel in a vertical position and thus require, in addition to all the transfer and storage equipment, a large capacity crane for lifting the fuel and surrounding casks from the transfer vehicles into the storage devices.

The present invention is directed to overcoming the problems of the prior art.

SUMMARY OF THE INVENTION

In one aspect of the invention, a storage system for irradiated nuclear fuel comprises a reusable transfer cask for shielding and transferring the irradiated nuclear fuel. The cask carries an elongated canister containing the irradiated nuclear fuel. This canister is positionable in an internal cavity of the transfer cask. The system also provides means for transferring the transfer cask with the canister inserted therein. The system further includes a horizontal storage module for storing the canister in a horizontal position. Means for positioning and moving the canister from the passage in the transfer cask into the module are provided by a hydraulic ram.

The canister includes a thin-walled cylindrical housing which is structurally capable of supporting the irradiated nuclear fuel, but which is not a substantial radiation barrier, a passage defined by said cylindrical housing for accepting the irradiated nuclear fuel, and first and second end plugs for providing nuclear radiation barriers at the ends of the canister. These plugs provide radiation protection at the ends of the canister when the canister is inside the transfer cask or module.

In yet another aspect of the invention, the horizontal storage module includes a passage for receiving the canister. Thick concrete walls are positioned about said passage for providing radiation shielding. The canister is cooled inside the module by natural convection provided by an internal cooling system.

In still another aspect of the invention, a plurality of modules are provided, each module including means for interlocking said modules to each other in a side by side relationship. The invention further includes a plurality of canisters, each canister placed horizontally in a module in a side by side relationship.

From the above it can be seen that the present invention provides for a horizontal, modular dry storage system for irradiated nuclear fuel. This system can use and reuse any presently licensed transfer cask for transferring the canister of the invention.

The transfer and storage of the canister is done horizontally so that the need for a large capacity overhead crane is eliminated at the storage facility. Further, as the modules can be individually fabricated and interlockingly positioned as required, the expense of establishing such a facility can be spread over a number of years as the need to increase the storage capability of the facility grows with the increase of irradiated fuel. These features provide economic advantages.

BRIEF DESCRIPTION OF THE FIGURES

FIG. 1 is a side view showing the operation of loading irradiated fuel assemblies into the canister of the invention, which is surrounded by a transfer cask. This operation is done in the existing fuel storage pools.

FIG. 2 shows the evacuation of water from the canister and cask.

FIG. 3 shows the positioning of the canister and cask on a trailer with tractor unit to be transported to a near-term storage facility which is generally located away from the reactor but on the same plant site from which the irradiated fuel came.

FIG. 4 depicts the positioning of the canister of the invention in a dry storage module of the invention for near-term storage.

FIG. 5 depicts a cross-sectional view of the canister of the invention surrounded by a transfer cask.

FIG. 6 includes multiple views of the canister and canister basket.

FIG. 7 is a perspective view of the dry storage module of the invention.

DETAILED DESCRIPTION OF THE PREFERRED EMBODIMENT

With reference to the figures, and in particular to FIGS. 1-4, apparatus and steps for the horizontal modular dry irradiated fuel storage system 10 of the invention are depicted. As shown in FIG. 1, the system 10 uses a specially designed dry shielded canister 12 which is shown in greater detail in FIGS. 5 and 6 and which is described hereinbelow. The canister 12 is inserted into a transfer cask 14. The transfer cask 14 and canister 12 are disposed by a crane 16 into an irradiated fuel storage pool 18 which is filled with water. Irradiated fuel which is contained in fuel assemblies such as assembly 20 can be stored in the pool 18. In order to remove the irradiated fuel, the fuel is placed in the canister 12, and appropriate seals and covers (as described below) are affixed to the canister before the canister 12 and transfer cask 14 are removed from the pool.

As shown in FIG. 2, upon removal from the pool, water is forced out of both the canister 12 and the transfer cask 14 with pressurized air being applied through selected ports. The canister 12 is further dried by using a vacuum pump to evacuate the canister. After this is accomplished, and in a preferred embodiment, helium gas is placed into the canister 12. Appropriate radiation shielding is provided by the shielded end plugs of the canister 46 and the transfer cask 14 during the transfer of the irradiated fuel assemblies.

As can be seen in FIG. 3, the transfer cask 14 is loaded into a horizontal position onto a transfer trailer 22 which has a specially designed skid 24. This skid allows the transfer cask 14 to be moved in three dimensions to permit alignment of the cask 14 with the horizontal storage module 26 which is depicted in FIG. 4.

As shown in FIG. 4, the cask is aligned with a port 28 of the dry storage module 26 and a hydraulic ram 30 which is at least partially insertable through a second port 32 is used to extract the canister 12 from the transfer cask 14 for storage in the horizontal storage module 26. Alternatively, a winch (not shown) could be used in place of ram 30. It is also to be appreciated that the reverse operation of pushing the canister 12 into a transfer module 14 for transferring the canister 12 to permanent storage can also be accomplished with the same technique.

In FIGS. 5 and 6, a more detailed view of the dry shielded canister 12 and the transfer cask 14 are shown. The dry shielded canister 12, in a preferred embodiment, is sized to hold irradiated fuel assemblies (FIG. 7). In a preferred embodiment, the main cylindrical housing 34 of the canister 12 is comprised of steel pipe. The primary choice in such a preferred embodiment is low-carbon steel or stainless steel. Such a housing is not adequate for unshielded transfer of irradiated fuel assemblies. However, the transfer cask 14, which is reusable, allows for the necessary protection. The canister 12 has skids 36, 38 circumferentially disposed around the outer periphery of the cylindrical housing 34. These skids facilitate the sliding of the canister 12 into and out of the transfer cask 14 and the spacing of the canister 12 away from the transfer cask 14.

The canister includes a shielded end-plug 40 which closes one end of the cylinder 34 which is disposed adjacent to the end 41 of cask 14. In addition, the canister 12 has disposed therein a basket arrangement 42 into which is disposed the irradiated fuel assemblies 20. Basket arrangement 42 includes in this embodiment a cluster of seven identical, square fuel cells 47 made of stainless steel clad boral (seven cells for pressurized water reactor fuel and fourteen for boiling water reactor fuel). Stainless steel plates 43 are used as support points. The canister 12 further includes a drain pipe 44. After the basket arrangement 42 is loaded with irradiated fuel assemblies 20, a head 46 which comprises a shielded end-plug is lowered into position across the open end of housing 34. The above end-plug is constructed of, in a preferred embodiment, double steel plates and a lead shield. The end-plugs allow contact operations to be performed at the end locations without the need for sophisticated remote handling equipment. Bolts (not shown) are used to secure the head 46 in place. At this point, water, which is usually demineralized water, can be pumped from the canister by pumping air into a port 50, forcing the water in this canister out through drainpipe 44. It is to be understood that for this operation to occur, the transfer cask 14 and canister 12 are lifted out of the pool 18 onto a platform preparatory to being loaded onto the transfer trailer 22.

It is further to be understood that a shielding ring 51, which in a preferred embodiment is comprised of steel clad lead, fits over the head 46 of the canister 12 when the canister 12 is inside of the transfer cask 14. The ring 51 is positioned outside of canister 12 between the canister 12 and the transfer cask 14 and reduces the radiation stream from between the canister 12 and cask 14 during loading, drying and sealing operation.

It is also to be understood that the water can be pumped out directly through the drainpipe 44. A vacuum can then be applied to the port 50 and/or the drainpipe 44 to complete drying. After this is accomplished, helium or air is used to fill the canister 12. Plugs 52 and 53 are then inserted into the drainpipe 44 and port 50. A seal plate 54 is then installed over the head 46 and welded in place. A protective cask plate 56 is then installed by bolts onto the transfer cask 14.

The transfer cask 14 is presently commercially available but is fitted with fuel basket assemblies (not shown). These assemblies must be removed so that the canister 12 can be inserted therein. It is to be understood that, through the use of the canister 12, irradiated fuel assemblies can be transferred and stored while reusing the transfer cask 14 as required. The transfer cask 14 includes inner and outer layers of steel with shielding material provided therebetween. The transfer cask includes a cylindrical body 60 with a head plate 56 specially designed to fit over the canister 12. The transfer cask 14 further includes a drainpipe 64 and a port 66 which can be used similarly to drainpipe 44 and port 50 to evacuate water from between the transfer cask 14 and the canister 12 and to then supply air thereto.

In FIG. 7, a detailed view of the horizontal dry storage module 26 is presented. The horizontal dry storage module 26 includes a housing 68 which is essentially in block form and is comprised, in a preferred embodiment, of reinforced concrete located on a load-bearing foundation 70 (FIG. 4). Embedded in housing 68 are I-beams 74. I-beams 74 support canister 12 when it is fully inserted into housing 68. Housing 68 includes a flared port 76 through which the canister 12 is inserted. The flared port 76 facilitates introduction of the canister into housing 68. Housing 68 includes a smaller rear access port 32 (FIG. 4) through which the hydraulic ram 30 can be inserted. The housing 68 further includes a shutter door 80 which can be comprised of steel and/or concrete and/or other appropriate radiation protection media and which can be pulled upwardly to allow access to the flared port 76.

The horizontal dry storage module 26 further includes an air cooling system 82 which includes a plurality of ports 84 disposed below the flanged port 76. These ports are communicated with an air plenum chamber 86 by passages such as passage 88. Passage 88 is offset. This offset is to minimize radiation leakage. The air in the plenum chamber 86 flows about the cylindrical passage 72, cooling the canister 12 disposed therein and thereby provides for the removal of decay heat. After the container 12 is cooled, the resulting hot air flows through ducts such as ducts 90 and 92 which are connected to exhaust manifolds 94 and 96, and therefrom is exhausted through exhaust ducts 98, 100. Housing 68 is designed with offset interlocks 102 and 104 which allow similar housings, such as housing 68, to be placed alongside housing 68 and interlocked therewith, so that several housings can be stacked together to provide additional shielding so as to minimize radiation leakage.

Industrial Applicability

It is to be understood that the present system thereof can be used to provide a solution to the problem of storage of irradiated fuel assemblies. The system is particularly appropriate for use as an interim solution to the irradiated fuel storage problem until guidelines, regulations and facilities are provided by the government. Accordingly, the present invention provides for an inexpensive temporary storage facility for irradiated fuel assemblies. The system uses and reuses existing casks to transfer canisters with the irradiated fuel assemblies to modules 26 for near-term storage. Further there is no requirement for a lifting crane at the storage site, as horizontal loading and unloading is provided for. Also the canister 12 can be comprised of a thin-walled material, as it is always protected either by the module 26 or by the transfer cask 14. It is further to be understood that, due to the use of existing technology and equipment, and due to the use of the horizontal dry storage module 26, that investment in such storage activity can be spread over a number of years, as the modules 26 need only be fabricated and positioned as they are required. Also, when appropriate long-term solutions for the storage of irradiated fuel assemblies have been reached, the modules can be easily deactivated and the assemblies still inside the canisters can be transported to the permanent storage facility.

Additional objects and advantages of the invention can be obtained from a view of the figures and the appended claims.

We claim:

1. A horizontal modular dry irradiated fuel storage system for storing irradiated nuclear fuel, comprising:
   a reusable, elongate transfer cask means for shielding and transferring the irradiated nuclear fuel, said transfer cask means having a cylindrical body which provides a radiation barrier, said cask cylindrical body defining a passage;
   an elongate canister means for containing the irradiated nuclear fuel, which canister means is positionable in said passage of said transfer cask means;
   said canister means having a lightweight cylindrical body with radiation shielded end plugs;
   said canister cylindrical body being structurally capable of supporting the irradiated nuclear fuel, but which is unable to provide a radiation barrier;
   means for transferring the transfer cask with the canister means inserted therein to a location for dry storage;
   module means for storing the canister means at the location with irradiated nuclear fuel contained therein in a horizontal position, wherein said module means includes a plurality of modules, each module including first and second side surfaces and a front surface having an entry port, said first and second side surfaces including interlocking means for locking said modules to each other in a side surface by side surface relationship;
   each said module including a passive means for removing nuclear decay heat which includes an air intake port and an air outlet port located in said module at positions other than through said first and second side surfaces such that said air inlet port and air outlet port are unobstructed when said modules are placed in a side surface by side surface relationship; and
   means for positioning the canister means from the passage in the transfer cask means through said entry port into the module means.

2. The system of claim 1: wherein each said module includes a top surface;
   wherein said air inlet port is located through said front surface below said entry port and said air outlet port is located through said top surface so that neither said air inlet port nor said air outlet port is obstructed with said modules interlocked in a side surface by side surface relationship; and
   wherein each said module includes a plenum means for cooling said canister, which plenum means communicates with said air inlet port and said air outlet port.

3. The system of claim 1:
   wherein said module means is comprised of concrete in order to provide a radiation barrier.

4. A horizontal modular dry irradiated fuel storage system for storing irradiated nuclear fuel comprising:
   a reusable, elongate transfer cask means for shielding and transferring the irradiated nuclear fuel, said transfer cask means having a cylindrical body which provides a radiation barrier, said cask cylindrical body defining a passage;
   an elongate canister means for containing the irradiated nuclear fuel, which canister means is positionable in said passage of said transfer cask means;

said canister means having a lightweight cylindrical body with radiation shielded end plugs;

said canister cylindrical body being structurally capable of supporting the irradiated nuclear fuel, but which is unable to provide a radiation barrier;

means for transferring the transfer cask with the canister means inserted therein to a location for dry storagre;

module means for storing the canister means with the irradiated nuclear fuel contained therein in a horizontal position; and means for positioning the canister means from the passage in the transfer cask means into the module means.

5. A horizontal modular dry irradiated fuel storage system for storing irradiated nuclear fuel comprising:

a reusable, elongate transfer cask means for shielding and transferring the irradiated nuclear fuel, said transfer cask means including a passage;

an elongate canister means for containing the irradiated nuclear fuel, which canister means is positionable in said passage of said transfer cask means;

means for transferring the transfer cask with the canister means inserted therein to a location for dry storage;

module means for storing the canister means at the location with the irradiated nuclear fuel in a horizontal position;

wherein said module means includes a plurality of modules, each module including first and second side surfaces, and a front surface having an entry port, said first and second side surfaces allowing said modules to be positioned next to each other in a side surface by side surface relationship, each said module including a passive means for removing nuclear decay heat including an air inlet port and an air outlet port located in said module at positions other than through said first and second side surfaces such that said air inlet port and air outlet port are unobstructed when said modules are placed in a size surface by side surface relationship, and with the air outlet port located above said air inlet port;

means for positioning the canister means from the passage in the transfer cask means into the module means.

6. The system of claim 5:

wherein said module means includes a top surface;

wherein said air inlet port is located through said front surface below said entry port and said air outlet port is located through said top surface so that neither said air inlet port nor said air outlet port is obstructed with said modules are positioned in a side surface by side surface relationship; and wherein each said module includes a plenum means for cooling said canister, which plenum means communicates with said air inlet port and said air outlet port.

7. The system of claim 5:

wherein said module lmeans is comprised of concrete in order to provide a radiation barrier.

8. The system of claim 5:

wherein said first and second side surfaces of said modules are provided with interlocking means for interlocking said modules together in a side surface to side surface relationship.

9. In a horizontal modular dry irradiated fuel storage system adapted for storing multiple irradiated nuclear fuel assemblies, and adapted for using a reusable, elongate transfer cask means for shielding and transferring the irradiated nuclear fuel assemblies, the transfer cask means having a cylindrical body which provides a radiation barrier, the cask cylindrical body defining a passage, the invention comprising:

an elongate canister means for containing the multiple irradiated nuclear fuel assemblies, which canister means is positionable in said passage of said transfer cask means;

said canister means having a lightweight cylindrical body defining an internal cavity, with radiation shielded end plugs, said canister cylindrical body being structurally capable of supporting the multiple irradiated nuclear fuel assemblies, but which is unable to provide a radiation barrier said canister means including a basket arrangement means for defining a plurality of irradiated fuel cells adapted for receiving irradiateed fuel assemblies;

said basket arrangemnt disposed inside said internal cavity of said lightweight cylindrical body of said canister means;

said basket arrangement including means secured to said plurality of irradiated fuel cells for structually supporting said cells relative to said lightweight cylindrical body of said canister means.

10. In a horizontal modular dry irradiated fuel storage system adapted for storing irradiated nuclear fuel contained in a canister, the invention, comprising:

module means adapted for storing the canister with the irradiated nuclear fuel contained therein in a horizontal position;

wherein said module means includes a plurality of modules, each module including first and second side surfaces, and a front surface having an entry port, said first and second side surfaces allowing said modules to be positioned next to each other in a side surface by side surface relationship, said module means including a passive means for removing nuclear decay heat including an air inlet port and an air outlet port located in each said module at positions other than through said first and second side surfaces such that said air inlet port and air outlet port are unobstructed when said modules are placed in a side surface by side surface relationship, and with the air outlet port located above said air inlet port;

wherein said module means includes a top surface;

wherein said air inlet port is located through said front surface below said entry port and said air outlet port is located through said top surface so that neither said air inlet port not said air outlet port is obstructed with said modules positioned in a side surface by side surface relationship; and wherein said module means includes a plenum means adapted for cooling the canister, which plenum means communicates with said air inlet port and said air outlet port;

wherein said first and second side surfaces of said modules are provided with interlocking means for interlocking said modules together in a side surface to side surface relationship.

11. The system of claim 10:

wherein said module means is comprised of concrete in order to provide a radiation barrier.

* * * * *